Patented Sept. 6, 1938

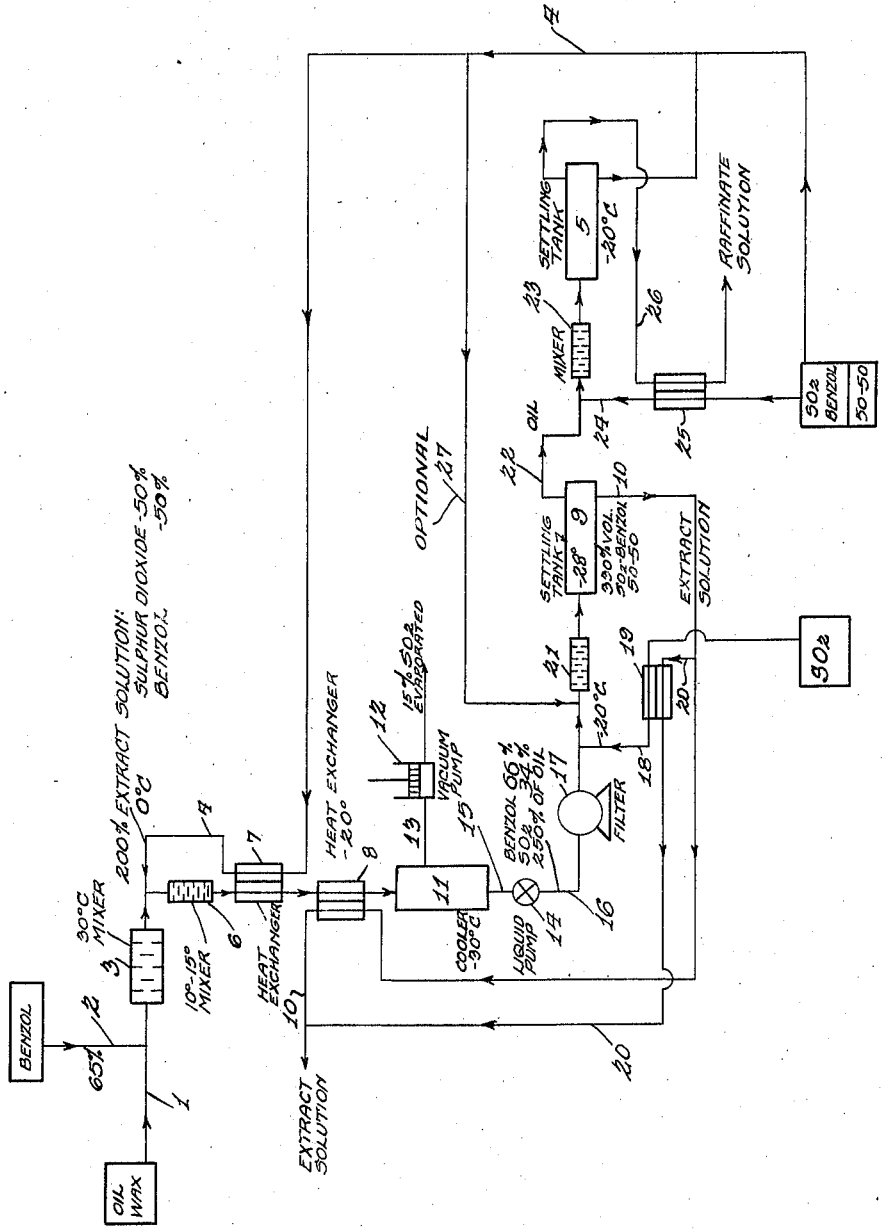

2,129,616

UNITED STATES PATENT OFFICE 2,129,616

MANUFACTURE OF IMPROVED LUBRICATING OILS

Wolfgang Grote and Alfred Hoppe, Berlin-Wilmersdorf, Germany, assignors to Edeleanu Gesellschaft m. b. H., a corporation of Germany Application January 12, 1935, Serial No. 1,582
In Germany January 24, 1934

12 Claims. (Cl. 196—17)

This invention aims to improve the economy and capacity of existing methods and plant equipment for dewaxing and refining hydrocarbon oils containing paraffins and aromatic substances that are undesirable in the finished product.

We have found that the process of dewaxing by means of dilution with suitable lighter liquids followed by cooling the solvent oil mixture, may economically be combined with that of extracting by using suitable solvent mixtures which are in a certain composition or strength first used as dewaxing diluents and then, after changing their composition or strength, used as selective solvents for the extraction. The solvents we prefer to use for this combination are suitable mixtures of liquid-sulphur-dioxide with benzol or with homologues of benzol having a boiling point no higher than that of toluene (111° C.–115° C.), or with chloroform, ether, carbon disulfide, or similar low boiling substances, or with mixtures of these substances.

According to our invention the oil to be dewaxed is diluted with a mixture, for example, of sulphur-dioxide and benzol, the mixture is cooled and then freed from wax with the aid of one of the well known separating processes, for example, with the aid of filter presses, whereupon liquid sulphur-dioxide is added to the cold solution of oil and sulphur-dioxide-benzol, so that the total mixture is brought within the miscibility gap of this solution system and a separation of extract solution from the mixture is obtained.

The remaining raffinate may then either immediately be freed of the solvent it carries in solution, or it may further be treated with a fresh sulphur-dioxide-benzol mixture, whereby the well known method of countercurrent extraction may be used. If the latter procedure is used, another solution of extract in benzol-sulphur-dioxide will be obtained which, or part of which, may suitably be used for prediluting the fresh oil to be dewaxed. In order to avoid the separation or dissolution of the oil into a raffinate and an extract layer before the dewaxing step, a sufficient amount of benzol should be added to the oil before dewaxing or to the extract solution used as diluent to bring the concentration of the benzol within the miscibility range of the solution's system. Such an increase of the benzol concentration in the extract solution used as diluent may, however, also be achieved by evaporating part of the sulphur-dioxide either from the extract solution or from the mixture of this extract solution and of the oil to be dewaxed.

In order to make it possible to carry out the method described above technically and economically, several special requirements must be met. It is important that the dewaxing be carried out with such an amount and with such a composition of the diluent that the amount of fresh sulphur-dioxide-benzol mixture required to be added to the prediluted oil in order to obtain separation in the extraction step, shall be within reasonable and economical limits. If this condition is not met, the excessive amount of solvent required would cause the loss of valuable raffinate components of the oil. It could not be expected that, at the low temperature necessary for separating out the wax, a complete miscibility would be obtained between the oil and the mixture of sulphur-dioxide and benzol if this mixture contains 20 or 30 or even more percent of sulphur-dioxide. It could also not be expected that the quantities of benzol and sulphur-dioxide required to be added to the oil for an effective dewaxing be so low as compared with the ratios of solvent and oil necessary for conventional diluents such as naphtha.

Both the above described advantages of the benzol-sulphur-dioxide mixture as diluting agent have the effect that after separating out the wax only relatively small additional amounts of sulphur-dioxide have to be added to the dewaxed oil in order to bring the oil solvent mixture into the miscibility gap, or range of dissolution or separation of the raffinate layer from the extract layer. Moreover, there is another factor contributing to this result: the lower the temperature is at which an oil is extracted with a mixture of sulphur-dioxide and benzol the more benzol may this solvent mixture contain without causing a decrease of the selectivity of the solvent mixture. In our invention extraction, which immediately follows dewaxing, is done at about the low temperature in any case required for dewaxing and no additional operating expenses for refrigeration are involved because of the extraction step.

The special advantages of our invention are the following: First, using the same solvents for dewaxing and for extracting effects considerable savings in the recovery of the solvents: second, the amount of refrigeration necessary for dewaxing the oil is made use of for the following extraction: and third, the use of sulphur-dioxide as one of the two components of the solvent mixture enables cooling the oil to be dewaxed by directly evaporating part of this sulphur-dioxide.

The attached drawing shows an arrangement of apparatus suitable for carrying out the process described above. The following is a description of this apparatus and of the method of operation for a specific example of oil to be treated and treatment conditions.

The oil to be dewaxed and extracted enters the apparatus by pipeline 1. Through pipeline 2 benzol in the amount of 65% of the oil by volume is introduced into the oil, and the mixture of oil and benzol is thoroughly mixed in a suitable mixing device 3. The temperature in this mixing device is 30° C. so that complete dilution is obtained in a very short time. After leaving the mixer 3 the oil-benzol solution is further diluted with 200% by volume of an extract solution coming from settling tank 5 through pipeline 4 and carrying sulphur-dioxide and benzol in the proportion of 50:50 by volume. The extract content of this extract solution is comparatively small and may be neglected in our example. In mixer 6 the two streams of liquid are thoroughly mixed; the presence of the relatively large amount of benzol prevents separation of the oil and the formation of two layers. In order to facilitate mixing, the extract solution coming from settler 5 at a temperature of −20° C. is preheated in heat exchanger 7 to about 0° C. so that a temperature of 10 to 15° C. results in mixer 6.

From mixer 6 the oil-benzol-sulphur-dioxide mixture flows through heat exchanger 7 and through heat exchanger 8 into the cooler 11. In heat exchanger 8 precooling of the solution to about −20° C. is obtained by heat exchange with another extract solution coming from settler 9 through pipeline 10 and entering heat exchanger 8 with about −28° C. The two heat exchangers 7 and 8 are advantageously provided with special devices for removing paraffin crystals from their inner surfaces.

In cooler 11 final cooling of the oil-sulphur-dioxide-benzol solution to −30° C. is obtained by evaporating about 15% by volume of sulphur-dioxide with the aid of vacuum pump 12 which is connected with cooler 11 by pipeline 13. The speed of cooling in this cooler can be regulated to cause the wax to settle out in large crystals. The oil-sulphur-dioxide-benzol solution leaving cooler 11 contains sulphur-dioxide, benzol and extract in the proportion of 34 parts by volume of sulphur dioxide to 66 parts of benzol and in the amount of 250% by volume based on the volume of the oil. This mixture, which is called extract solution, is discharged from cooler 11 by pump 14 through pipeline 15 and is pumped through pipeline 16 into the filter 17 in which the wax is separated from the oil.

The remaining filtrate, that is, the dewaxed oil with 250% by volume of sulphur-dioxide-benzol solution, is after leaving filter 17 further diluted with sulphur-dioxide in the amount of 80% by volume based on the original undewaxed oil. This sulphur-dioxide, coming from an outside source, is introduced into the oil-solvent mixture by pipeline 18 after having passed the heat exchanger 19, in which its temperature is reduced to −20° C. by heat exchange with part of the extract solution withdrawn from settler 9 through pipeline 10; this part of the extract solution entering heat exchanger 19 through pipeline 20. In mixer 21 the oil-solvent solution is thoroughly mixed with the newly introduced sulphur-dioxide. The total amount of solvent present in the mixture is now 330% by volume sulphur-dioxide-benzol in the volume proportion 50:50 and the temperature of the mixture is about −28° C. Under these conditions the oil is separated into two phases, a raffinate solution and an extract solution, these solutions being separated from each other in settler 9 due to the difference in their specific gravities.

The raffinate solution is withdrawn from settler 9 through pipeline 22 and flows into mixer 23. Shortly before reaching mixer 23 the pipeline 22 is connected with a pipeline 24 through which fresh sulphur-dioxide-benzol in the amount of 200% by volume (based on the original oil) and in the proportion of 50 volume parts sulphur-dioxide to 50 volume parts benzol is introduced into the raffinate solution. The two streams of liquid are thoroughly stirred in mixer 23 and the resulting new mixture enters settler 5 in which again a raffinate and an extract layer are formed. The fresh sulphur-dioxide-benzol mixture introduced into mixer 23 through pipeline 24 has been precooled in heat exchanger 25 to about −15° C. by heat exchange with the raffinate solution withdrawn from settler 5 through pipeline 26. The temperature in settler 5 is about −20° C.

The extract solution leaving exchanger 8 through pipeline 10 and the raffinate solution leaving heat exchanger 25 are in the normal way freed of solvent by evaporation, whereby part of the recovered mixed solvent is at the same time separated into more or less pure sulphur-dioxide and benzol by rectification. In this way the pure benzol is obtained that is used in the dewaxing step and the pure sulphur-dioxide which is necessary for the extraction step.

In case of treating low viscosity oils it will not be necessary to preheat the extract solution from settler 5 in heat exchanger 7 since with such an oil sufficiently effective diluting is obtained in mixing device 6 at lower temperatures. It is further possible to dispense with heat exchanger 8 if a higher proportion of sulphur-dioxide is used for the second extraction step in mixer 23, so that a higher sulphur-dioxide content of the mixture entering cooler 11 is obtained which allows for a better cooling by direct evaporation of sulphur-dioxide in this cooler. The same effect may be obtained by introducing a mixture of benzol and sulphur-dioxide through pipeline 2 instead of pure benzol. In special cases it may further be of advantage to replace expansion cooler 11 by a two-step arrangement whereby part of the total amount of sulphur-dioxide to be evaporated for cooling purposes is in the first step expanded at a higher pressure. In this way the total compressor volume may be reduced and further a certain amount of power is saved.

In case that the amount of extract solution obtained in settler 5 is larger than the amount of solvent necessary for diluting the oil in the dewaxing step, part of this extract solution may be branched off from pipeline 4 through pipeline 27 and directly introduced into mixer 21, so that this part of the extract solution participates in extracting but not in dewaxing the oil. The same procedure is advisable in a case where it is desirable to use a higher sulphur-dioxide concentration in the extraction step so that with an arrangement as shown in the drawing it would be necessary to add larger amounts of benzol in the dewaxing step in order to make sure that complete solubility is maintained and that no extract is formed in this step.

The following examples will further illustrate how the invention may be carried out in practice but it should be understood that the invention is not limited to the said examples.

Example 1

An overhead cylinder stock from Mid-Continent crude with the specific gravity of .921 at 20° C., viscosity of 153 S. U. at 99° C., a viscosity gravity constant of .845 and with a pour point of 24° C. is treated with 200% by volume of a sulphur-dioxide-benzol extract solution in which the volume proportion of the sulphur-dioxide to that of the benzol is 35:65. A surplus of liquid sulphur-dioxide is added to this mixture and the mixture is subsequently cooled to −30° C. by evaporating this surplus of sulphur-dioxide, and then freed from wax in a filter press. The filtrate is further diluted with 60% by volume (based on the original distillate) of liquid sulphur-dioxide of a temperature of −30° C., whereupon dissolution into a raffinate and an extract phase occurs in a settling container filled with the mixture. The raffinate solution obtained thereby is in a second stage mixed with 200% by volume of sulphur-dioxide-benzol in the proportion 50:50 at −30° C. whereby a new raffinate solution and a new extract solution are obtained. This second extract solution is used for diluting a new batch of oil to be dewaxed, while the raffinate solution is freed of the dissolved sulphur-dioxide and benzol by evaporation. The raffinate thereby obtained has a specific gravity of .896 at 20° C., a viscosity of 128 S. U. at 99° C., a viscosity gravity constant of .810 and a pour point of −25° C.

Example 2

A long cut wax distillate of Mid-Continent origin with the specific gravity of .947 at 20° C., viscosity of 119 S. U. at 99° C., a viscosity gravity constant of .885 and with a pour point of 29° C. is mixed with 250% by volume of a sulphur-dioxide-benzol extract solution. The solution consists of sulphur-dioxide-benzol in the volume proportion of 35:65. After adding the necessary surplus liquid sulphur-dioxide, the mixture is cooled to −20° C. by evaporating the added sulphur-dioxide whereby the wax contained therein crystallizes. The wax is separated from the solution in a filter press. Thereafter the filtrate is diluted with 110% by volume (based on the original distillate) of liquid sulphur-dioxide which was cooled to −20° C. in a following settling container the mixture separates into raffinate solution and extract solution. The raffinate solution in a second stage is again treated with 350% by volume of fresh sulphur-dioxide-benzol in the volume proportion of 55:45 at −20° C. The extract solution obtained thereby is then used for diluting the distillate while in the following evaporating equipment the raffinate is freed from the solvents. After the evaporation the raffinate has a specific gravity of .887 at 20° C., a viscosity of 75 S. U. at 99° C., a viscosity gravity constant of .814 and a pour point of −18° C.

Example 3

A crude lubricating oil of Californian origin with a specific gravity of .945 at 20° C., viscosity of 130 S. U. at 99° C. and a pour point of 25° C. is mixed with 300% by volume of a mixture of sulphur-dioxide and toluene in the volume ratio of 25:75. The mixture is filtered at a temperature of −25° C. The wax free filtrate is then diluted with 200% by volume (based on original distillate) of liquid sulphur-dioxide which was cooled before to −20° C. On allowing this mixture to settle in an insulated container two layers are formed the upper of which being the raffinate solution. By evaporating the toluene and $SO_2$ contained therein in a following evaporating system a raffinate is obtained of the following data: Specific gravity .892 at 20° C., viscosity 80 S. U. at 99° C. and pour point of −22° C.

What we claim is:

1. A process for dewaxing and refining hydrocarbon oils, comprising dissolving the oil in a mixture of liquid sulphur dioxide with a diluting aid of the character typified by benzol, homologues of benzol and similarly acting low boiling substances miscible therewith and with the oil, and mixtures of these, for the purpose of dewaxing the oil and also for the subsequent refining of the oil, the diluting of the oil for the purpose of dewaxing being done with a mixture of these solvents containing the diluting aid in excess, cooling the mixture to separate out the wax, raising the sulphur dioxide concentration in the dewaxed oil-solvent solution so that the desired separation of the oil into extract and raffinate is obtained, re-extracting the raffinate with a solvent comprising liquid sulphur dioxide, and recycling a part of the extract solution thus obtained to commingle same with the incoming waxy oil and diluting aid.

2. A cyclical process for dewaxing and extracting according to claim 1, comprising using the extract solution obtained in the second extraction step as the dewaxing solvent for increasing the diluting aid concentration in the solution, this increasing of the diluting aid concentration being effected by evaporating part of the sulphur-dioxide from the solution.

3. A cyclical process for dewaxing and extracting according to claim 1, comprising using part of the extract solution obtained by the second separation of the oil into extract and raffinate for diluting the oil prior to dewaxing it, and adding the remainder of this extract solution as extracting agent to the oil coming from the dewaxing step.

4. A cyclical process for dewaxing and extracting according to claim 1, comprising diluting the oil to be dewaxed and refined first with a certain amount of diluting aid alone and subsequently with a mixture containing sulphur-dioxide and diluting aid and additionally containing a certain amount of extract as obtained in the second extracting step of the process.

5. A process according to claim 1, comprising adding a certain surplus amount of sulphur-dioxide to the mixture of oil and diluting agent and cooling the mixture by evaporating this surplus amount of sulphur-dioxide.

6. A process for dewaxing and refining hydrocarbon oils comprising dissolving the oil in a mixture of liquid sulphur dioxide and a diluting aid of the class of benzol and its homologues which are miscible with liquid sulphur dioxide and with the oil being treated, lowering the temperature to precipitate the wax and freeing the mixture from wax, increasing the concentration of liquid sulphur dioxide in the mixture by addition thereof at low temperature to cause a separation of the desirable from the undesirable constituents of the oil into two liquid phases, separating the phases into raffinate and extract mixtures, adding liquid sulphur dioxide to the raffinate mixture to produce a second extract, and recycling a portion of this extract to the wax freed mixture to aid in increasing the concentration of liquid sulphur dioxide therein.

7. A cyclical process for dewaxing and refining hydrocarbon oils comprising adding to the waxy oil a low boiling diluent of the class of benzol and an extract solution produced during an extracting step in proportions to avoid phase separation at the dewaxing temperature, cooling the oil solvent mixture and separating out the wax, adding liquid $SO_2$ in sufficient volume to produce phase separation between the paraffinic and aromatic constituents of the oil, separating the aromatic extract phase from the paraffinic raffinate phase and treating the latter further in one or more stages with an extracting solvent containing liquid $SO_2$ and a substance of the class of benzol, and using the second extract solution thus obtained in the dewaxing diluent for the incoming waxy stock whereby a saving in solvents and power is effected.

8. A cyclical process for dewaxing and refining hydrocarbon oils comprising using a diluent solvent containing mainly a low boiling liquid miscible with the oil of the character and action of benzol and an extracting solvent containing liquid sulphur-dioxide and having a low boiling point relative to the diluent solvent, adjusting the proportions of diluent solvent and extracting solvent to effect dewaxing by precipitation of wax at low temperature without phase separation and readjusting said proportions to effect extracting by phase separation at about said low dewaxing temperature, re-extracting the raffinate thereby produced, and recycling a portion of the extracted constituents of the oil thereby segregated to augment the dewaxing diluent for treating additional oil, whereby a saving in solvents and power is effected.

9. In a cyclical process for dewaxing and refining hydrocarbon oils using a diluent solvent containing mainly a low-boiling substance of the character and action of benzol and an extracting solvent containing said substance and liquid sulphur-dioxide, effecting dewaxing by dilution and precipitation of the wax at a low temperature and thereafter effecting extracting by increasing the proportion of liquid sulphur-dioxide to cause phase separation at about said low dewaxing temperature, re-extracting the raffinate thereby produced, and recycling a portion of the extracted constituents of the oil thereby segregated to augment the dewaxing diluent in effecting dewaxing and another portion to aid in the first extraction treatment substantially as described.

10. A process for dewaxing and refining hydrocarbon oils of the type of wax-containing lubricating stock comprising diluting said oil with about 200% of a sulphur-dioxide-benzol mixture containing between 60 and 70 percent benzol, adding sufficient sulphur-dioxide to cool the mixture by evaporation thereof to about −30° C., evaporating said additional sulphur-dioxide and freeing the mixture of the precipitated wax, further diluting said mixture with about 60% of liquid sulphur-dioxide and obtaining a phase separation into an upper raffinate portion and a lower extract portion, and drawing off said raffinate and extract portions separately, extracting said raffinate portion further at −30° C. with 200% of a mixture containing equal volumes of liquid sulphur-dioxide and benzol, whereby a second raffinate portion and a second extract portion are obtained, recovering the solvents from said second raffinate portion and using said second extract portion as diluting aid for the incoming wax containing lubricating stock.

11. A process for dewaxing and refining hydrocarbon oils of the type of wax-containing lubricating stock comprising diluting said oil with about 250% of a sulphur-dioxide-benzol mixture containing between 60 and 70 percent benzol, adding sufficient sulphur-dioxide to cool the mixture by evaporating said additional sulphur-dioxide and freeing the mixture of the precipitated wax, further diluting said mixture with about 110% of liquid sulphur dioxide and obtaining a phase separation into an upper raffinate portion and a lower extract portion, and drawing off said raffinate and extract portions separately, extracting said raffinate portion further at −20° C. with 350% of a mixture containing 55 volumes sulphur-dioxide and 45 volumes benzol, whereby a second raffinate portion and a second extract portion are obtained, recovering the solvents from said second raffinate portion and using said second extract portion as diluting aid for the incoming wax containing lubricating stock.

12. A cyclical process for dewaxing and refining hydrocarbon oils comprising adding to the oil a diluent solvent blend containing mainly an oil-miscible solvent of the character and action of benzol having a boiling point not over 115° C. and liquid sulphur dioxide having a boiling point substantially below that of the diluent, cooling the oil solvent mixture to a low temperature to precipitate wax without phase separation, removing the wax and adjusting the proportions of the solvents to cause separation into extract and raffinate phases at about said low dewaxing temperature, separating the phases and removing from the raffinate portion of the dewaxed oil solvent mixture a second extract solution containing said solvents and dissolved oil components, and utilizing as said extracting solvent a part of said second extract solution, thereby effecting a saving in solvents and power.

WOLFGANG GROTE.
ALFRED HOPPE.